(12) United States Patent
Cadiz et al.

(10) Patent No.: US 8,019,067 B2
(45) Date of Patent: Sep. 13, 2011

(54) USER INTERFACE FOR TELEPHONE SYSTEM ADMINISTRATION

(75) Inventors: Jonathan J. Cadiz, Redmond, WA (US);
Gursharan S. Sidhu, Seattle, WA (US);
Jai Srinivasan, Kirkland, WA (US);
Xuedong Huang, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1571 days.

(21) Appl. No.: 11/370,097

(22) Filed: Mar. 7, 2006

(65) Prior Publication Data

US 2007/0211878 A1    Sep. 13, 2007

(51) Int. Cl.
*H04M 3/42* (2006.01)

(52) U.S. Cl. .......... 379/201.04; 379/225; 379/219; 379/156; 370/259

(58) Field of Classification Search .......... 379/201.04, 379/201.03, 156, 219, 225, 142.02; 370/352; 270/259
See application file for complete search history.

(56) References Cited

U.S. PATENT DOCUMENTS

2002/0114318 A1 * 8/2002 Rines .......................... 370/352
2004/0001579 A1 * 1/2004 Feinberg et al. ............. 379/156

OTHER PUBLICATIONS

Centrepoint Technologies, Inc.; Talkswitch: Answers with Intelligence; www.talkswitch.com, 2006.
KCE Technology Corporation, FX-207 Instruction Manual, 2006.
Fonality, Fonality Screenshot, www.fonality.com, 2006.
Gotvmail Communications, LLC, GotVMail, www.gotvmail.com, 2005.
D-Link Corporation, SIP IP-PBX with Conferencing Server, www.dlink.com, 2006.
OSTG Open Source Technology Group, SourceForge, www.sourceforge.net, 2006.
Four Loop Technologies, LLC; switchvox; www.switchvox.com, 2006.

* cited by examiner

*Primary Examiner* — Ahmad F Matar
*Assistant Examiner* — Vedesh Rampersad
(74) *Attorney, Agent, or Firm* — L. Alan Collins; Collins & Collins Incorporated (57) ABSTRACT

A user interface for a telephone system may include a telephone portion operable to provide telephone administration functionality for each of a plurality of telephones of a telephone system. The telephone portion may include a telephone icon corresponding to at least one telephone of the plurality of telephones, the telephone icon operable to provide the telephone administration functionality for the at least one telephone. Other portions of the user interface may include an external line portion, an extension portion, or a user portion, which may include, respectively, an external line icon, an extension icon, and a user icon, where each icon may provide associated administration functionality. Accordingly, the user interface allows an administrator of the telephone system to easily view and administer the devices and elements of the telephone system.

17 Claims, 6 Drawing Sheets

USER INTERFACE FOR TELEPHONE SYSTEM ADMINISTRATION

TECHNICAL FIELD

This description relates to telephone systems.

BACKGROUND

Advanced telephone systems may be used, for example, to provide configurable, convenient, and cost-effective telephone usage to a group of users. For example, a private branch exchange (PBX) may be used at a building or other site that is associated with a particular group of users. For instance, a business in an office building may employ a PBX for the benefit of the employees and owners of the business. In some cases, advanced telephone systems may be implemented using a computer network, e.g., a local area network of the business.

Advanced telephone systems may provide a number of advantageous features to employees and owner(s) of a business. For example, the employees may be provided with telephone features including voice mail, call conferencing, or call transfer/forwarding between employees. Owners of the business may experience cost savings by associating multiple telephones with one external telephone line (i.e., an external telephone line of a telephone service provider), so that fees associated with the external line(s) may be reduced in comparison to a configuration in which each telephone is provided with an associated external telephone line.

Further, the owner may be provided with a variety of features that may increase customer satisfaction or employee productivity. For example, customer satisfaction may be improved by using automatic answering features for receiving customer calls, and employee productivity may be improved by providing employees with useful information (e.g., including office closure announcements or other business-wide announcements). Additionally, such advanced telephone systems may allow the owner of the business to monitor and track phone usage of employees of the business, or of the business as a whole.

Administration of such telephone systems, however, has traditionally been complex and problematic, and has required advanced knowledge for setup, configuration, and maintenance thereof. As a result, if a customer (e.g., a small business, home-based business, or high-end home) purchases a conventional telephone system, the customer typically hires an outside firm or other contractor or employee to perform the majority of the installation work. Furthermore, when a change is required in such settings (sometimes, for example, a change as small as adjusting the time twice a year for daylight savings), the outside firm typically is hired again to make the change. As a result, the customer incurs the costs associated with hiring the outside firm (potentially adding substantial cost to the purchase price and total cost of ownership for a conventional phone system). Additionally the customer may experience delays and inconveniences when changes are required, since (even for minor changes), an appointment is scheduled with the outside firm. Still further, the customer may be frustrated with the inability to self-administer a conventional telephone system. In short, conventional telephone systems are not designed to be installed or maintained by people who have not trained to be telephone system experts.

SUMMARY

A user interface for a telephone system may include a telephone portion that provides telephone administration functionality for a plurality of telephones of a telephone system. The telephone portion may include telephone icons corresponding to the plurality of telephones, so that, for example, each telephone icon may correspond to a particular telephone of the telephone system. Each telephone icon may be provided in association with information about a corresponding telephone, such as, for example, a user of the telephone, or a location of the telephone. Further, each telephone icon may provide the telephone administration functionality for its corresponding telephone. Thus, an administrator of the telephone system may easily view the telephones of the telephone system, and may easily add or modify telephone(s), or characteristics thereof, using the user interface.

Other portions of the user interface may include portions corresponding to other elements (e.g., devices) of the telephone system. For example, the telephone system may include elements, such as, for example, an external line connecting the telephone system to an external telephone network, or a numerical extension(s) associated with a telephone or a user. In such cases, the user interface may include, for example, an external line portion, an extension portion, or a user portion, which may include, respectively, an external line icon, an extension icon, and a user icon.

Each icon may provide associated administration functionality, so that, for example, the external line icon provides for administration of the external line (e.g., addition of a new external line), the extension icon provides for administration of the extension(s) (e.g., association of the extension(s) with an additional telephone or user), and the user icon provides for administration of the user(s) (e.g., removal of a user from the telephone system). Accordingly, the user interface allows an administrator of the telephone system to easily view and administer the elements (e.g., devices) of the telephone system.

Thus, at least a portion (e.g., a telephone portion, or an extension portion) of a graphical user interface may be provided that is associated with a class of an element of a telephone system (e.g., the class may be telephones, extensions, external lines, or users). Administration functionality may thus be provided for the element, and the administration functionality may include at least one configuration screen associated with configuring the element for use with the telephone system. Once configured, an element icon (e.g., a telephone icon, or an extension icon) may be provided in the graphical user interface that represents the element and is associated with the administration functionality. The administration functionality may include status information associated with a current status of the element within the telephone system.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

DETAILED DESCRIPTION

Figure 1:
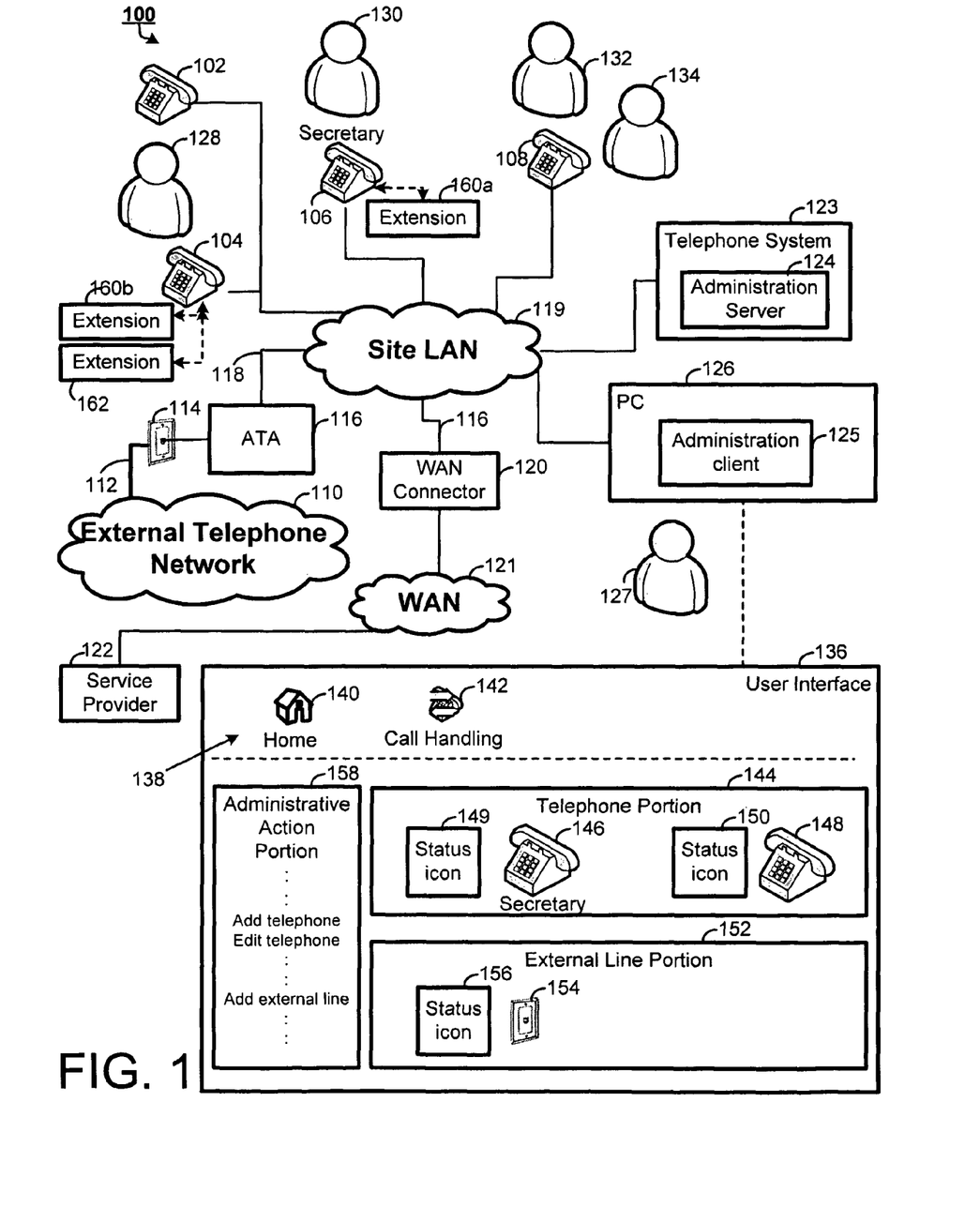
FIG. 1 is a block diagram of an example of a networked telephone environment.

FIG. 1 is a block diagram of an example of a networked telephone environment 100. The networked telephone environment 100 may be associated with, as referenced above, a business or other group of users, and is discussed below in the example of FIG. 1 with reference to a business. However, it should be understood that the networked telephone environment 100, or variations thereof, may be used by virtually any group of users that wishes to share telephone service to some degree, including, for example, a school, household, or governmental agency.

In the example of FIG. 1, the networked telephone environment 100 is illustrated as including telephones 102, 104, 106, and 108. Of course, although only the telephones 102-108 are illustrated in the example of FIG. 1 for the sake of clarity and brevity, an appropriate number of telephones may be used in a given implementation of the networked telephone environment 100, as would be apparent. The telephones 102-108 may include any telephone adapted for use within the networked telephone environment 100, such as, for example, analog phones, session initiation protocol (SIP) phones, or wireless phones (and any associated network access points). Further, although telephones 102-108 are illustrated in the example of FIG. 1, it should be understood that virtually any other communications device used in conjunction with networked telephones also may be used, such as, for example, fax machines or computer(s) running telephone-related software.

Further in FIG. 1, an external telephone network 110 is illustrated that provides telephone service in association with the networked telephone environment 100. The external telephone network 110 may include any network or service that provides public or private telephone service, including, for example, a public telephone system, e.g., the Public Switched Telephone Network (PSTN) or the Integrated Services Digital Network (ISDN).

The external telephone network 110 is connected to an external line 112, where, in the example of FIG. 1, the external line 112 provides a connection to the external telephone network 110 for the networked telephone environment 100 and the external telephone network 110. The external line 112 may thus represent virtually any connection or interface between a telephone service provider and the networked telephone environment 100, including, for example, an analog phone line, a digital phone line, or a wireless telephone line.

An outlet 114 represents a connection (e.g., a wall connection) that may be used at a building or other site associated with the example business that is discussed with reference to FIG. 1. That is, the outlet 114 may be connected, through the external line 112, to the external telephone network 110. Further, in the example of FIG. 1, it is assumed that the external telephone network 110 provides analog telephone service over the external line 112 and, accordingly, an analog telephone adapter (ATA) 116 is included that is operable to convert the analog signals of the external telephone network 110 into a digital format. For example, the ATA 116 may convert the analog signal received from the external line 112 into a Voice Over Internet Protocol (VoIP) signal.

Accordingly, telephone signals received from the external telephone network 110 may be transmitted over a connection 118 to a local area network (LAN) 119 that is associated with a building or other site of the business, i.e., may be transmitted in a format that is compatible with the site LAN 119. In this way, the telephones 102-108 may be connected within the networked telephone environment 100 using a network (i.e., the site LAN 119) that may already be available to the business, and/or that may provide various other known features and advantages (such as, for example, internal e-mail, intranet, or sharing of networked office equipment between employees).

As another example of how telephone service may be provided in the networked telephone environment 100, a Wide Area Network (WAN) connector 120 is illustrated as being connected to a WAN 121. For example, the WAN connector 120 may represent a cable modem or Digital Subscriber Line (DSL) router, and the WAN 121 may represent the public Internet. In this way, a service provider 122, e.g., a provider of VOIP telephone services, may be used to obtain telephone service for the networked telephone environment 100. In this example, then, the ATA 116 is not needed for conversion of the incoming telephone signals to digital form, since the telephone signals are already in digital form for transmission over the WAN 121.

Further in FIG. 1, a telephone system 123 is illustrated that is connected to the site LAN 119. As described above, the telephone system 123 may be used to avoid the connecting of each of the telephones 102-108 to the external telephone network 110 (or to the WAN 121 using the WAN connector(s) 120). Rather, the telephones 102-108 are connected to the telephone system 123, so that the telephone system 123 may provide access to the external telephone network 110 (or the WAN 121) on an as-needed basis, while also providing fast, reliable internal connections between the telephones 102-108. In this way, cost-savings are obtained, since a number of external lines may be reduced. Additionally, the telephone system 123 may be used to provide many other advantageous features, such as, for example, voicemail, call transfer, or call waiting, to name a few. Still further, the telephone system 123 is highly configurable, so that, for example, telephones, external lines, or users may be added or removed from the networked telephone environment 100, or may be configured within the networked telephone environment 100.

In one example, the telephone system 123 may represent a Private Branch Exchange (PBX). For example, a PBX may be used which automatically selects between available external lines, e.g., in response to a user dialing "9" (followed by an outgoing number) on one of the telephones 102-108. In another example, the telephone system 123 may represent a key system, which may be designed for, and used in, relatively small-scale settings in which, for example, users may manually select one of a few available outgoing lines. As yet another example, the telephone system 123 may represent a VOIP PBX system (also known as an IP-PBX system), which uses the Internet protocol to transmit calls, e.g., using the WAN connector 120 and the WAN 121. Other examples of the telephone system 123 also exist.

The telephone system 123 includes an administration server 124 for administering other elements within the networked telephone environment 100. More specifically, the administration server 124 may be accessed by an administration client 125 running on a personal computer (PC) 126 (or other workstation or device). In this way, an administrator 127 may simply download or otherwise install the administration client 125 to the PC 126, establish communication with the administration server 124 over the site LAN 119, and thereafter may quickly and easily setup, configure, or otherwise administer the telephone system 123, even if the administrator 127 does not have experience or training as a telephone system expert.

Thus, the administrator 127 may represent, for example, an owner of the business, or an employee of the business charged with administering the telephone system 123. In administering the telephone system 123, the administrator 127 may be provided with telephone administration functionality for the telephones 102-108. Such telephone administration functionality may, for example, allow the administrator 127 to set-up and/or configure the telephones 102-108 in a desired manner, and may include, for example, an ability to add/remove one of the telephones 102-108 to/from the networked telephone environment 100, or may include an ability to associate (or disassociate) one or more calling features (e.g., voicemail or call waiting) with a selected one(s) of the telephones 102-108.

In addition to the telephone administration functionality, the administrator 127 also may be provided with user administration functionality associated with one or more of a user 128, a user 130, a user 132, or a user 134. For example, the users 128-134 may represent employees of the business, so that the user administration functionality may allow the administrator 127 to modify user information, including addition or removal of one or more of the users 128-134 from association with (or access to) the telephone system 123. The user administration functionality may include, for example, association of one or more of the users 128-134 with one or more of the telephones 102-108. For example, it may be the case, as shown in FIG. 1, that the user 128 may be associated with more than one telephone (e.g., the telephone 102 and the telephone 104). Conversely, the telephone 108 may be associated with one or more users (e.g., the users 132 and 134, as shown).

In providing the telephone administration functionality, the user administration functionality, and other types of administration functionality, the administration client 125 may provide a user interface 136 that allows the administrator 127 to interact with the administration server 124 to configure or otherwise administer the telephone system 123 in an easy, convenient, and intuitive manner. Thus, the personal computer 126 (which may represent, for example, a desktop computer, a laptop computer, a personal digital assistant (PDA), or virtually any type of computing device operable to execute the administration client 125), may implement, or be associated with, software (e.g., the administration client 125) and/or hardware that is/are operable to operate an associated display device. As a result, for example, such a display device may be operable to render the user interface 136 in response to instructions from the personal computer 126 and from the administration client 125. For example, such a display may include, a Liquid Crystal Display (LCD), and/or a touch-screen display, or any monitor or display operable to render the user interface 136.

In the example of FIG. 1, the user interface 136 includes a header portion 138 having a home icon 140 and a call handling icon 142. In some implementations, the header portion 138 may be permanent to the user interface 136, i.e., may always be kept visible in the user interface for selection by the administrator 127.

Figure 2:
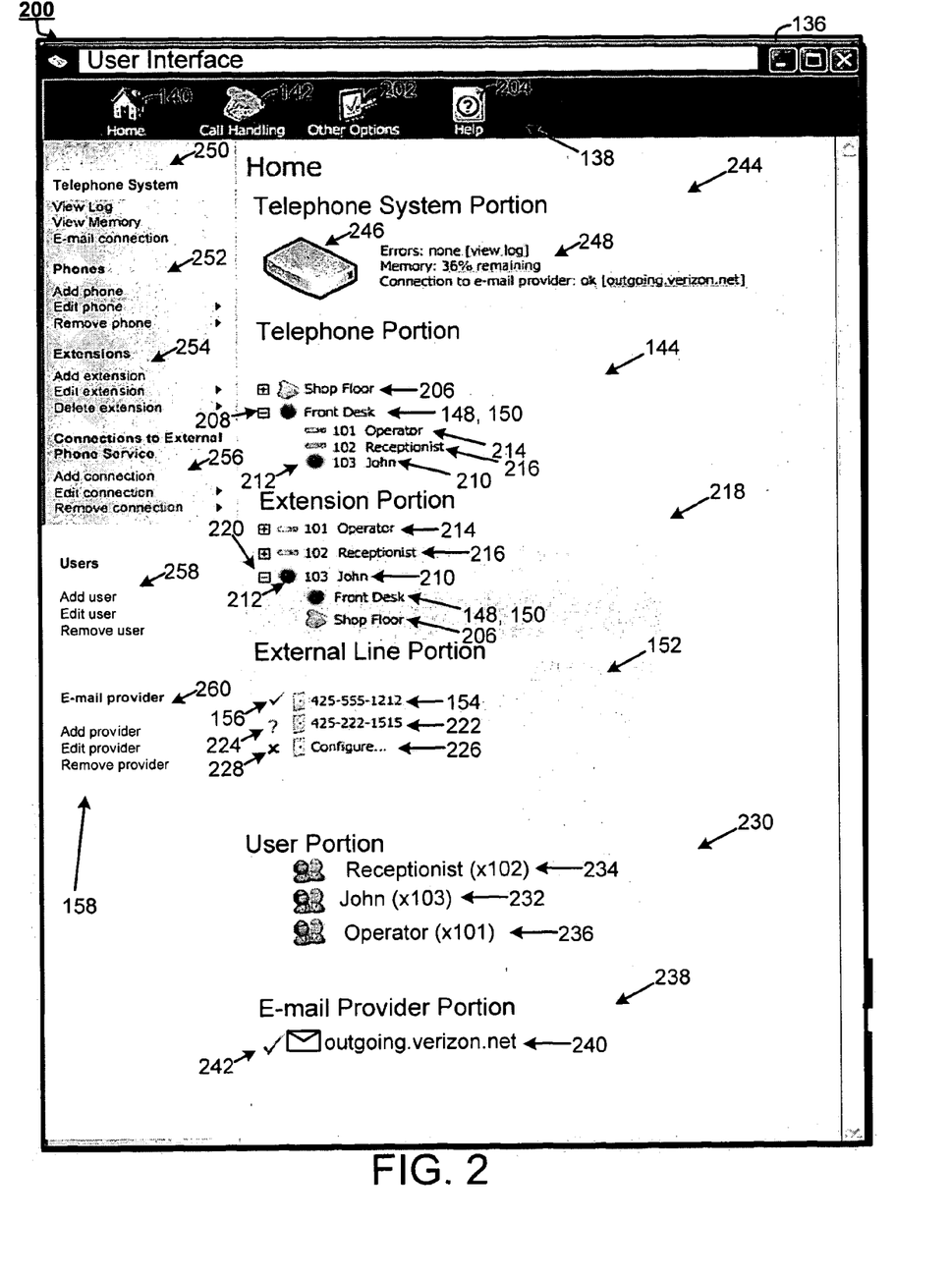
FIG. 2 is a screenshot of an example implementation of a user interface of a telephone system of the networked telephone environment of FIG. 1.

The home icon 140, as explained in more detail below with reference to a remainder of the discussion of FIG. 1, and with respect to FIG. 2, provides the administrator 127 with one or more user interface portions, where each user interface portion corresponds to one or more element(s) (e.g., device(s)) of the networked telephone environment 100. Each such user interface portion may be operable to provide the administrator 127 with a view of virtually any or all element(s) (e.g., devices) in the networked telephone environment 100, and also may provide associated administration functionality for that element(s).

Meanwhile, the call handling icon 142, as described below, for example, with respect to FIG. 3, allows the administrator 127 to configure a manner in which incoming calls to the telephone system 123 are handled or routed. In the example of FIG. 1, the home icon 140 has been selected, so that examples of the just-referenced user interface portions are illustrated. For example, a telephone portion 144 is illustrated that includes a telephone icon 146 and a telephone icon 148. The telephone icon 146 and the telephone icon 148 each may correspond to, and thereby represent, one of the telephones 102-108 of the telephone system 123.

In general, it should be understood that there may be a one-to-one relationship between telephone icons of the telephone portion 144 and the telephones 102-108 of the networked telephone environment 100, although only the two telephone icons 146 and 148 are illustrated in FIG. 1, for the sake of brevity. The telephone icons 146 and 148 (and additional telephone icons, not shown) may thus be used to provide telephone administration functionality for corresponding telephones of the telephone system 123.

For example, the telephone icon 146 may be displayed within the telephone portion 144 in conjunction with an identifier associating the telephone icon 146 with its associated telephone. For example, the telephone icon 146 may be identified as being associated with the user 130, who, in the example of FIG. 1, is a secretary of the business, so that the telephone icon 146 is labeled "secretary." In this way, the administrator 127 may quickly see that the telephone icon 146 corresponds to the telephone 106 of the secretary 130.

Other telephone administration functionality provided by the telephone portion 144, e.g., by the telephone icons 146 and 148, may include, for example, a network address of the corresponding telephone, a type of the corresponding telephone (e.g., a SIP telephone), or other administratively-useful information. For example, status information regarding the corresponding telephone may be provided as part of the telephone administration functionality, by including a status icon 149 in association with the telephone icon 146 (and, similarly, by providing a status icon 150 in association with the telephone icon 148). For example, as described in more detail below with respect to FIG. 2, the status icon 149 may include a green check mark or a red "X" to illustrate an on-line or off-line status, respectively, of the corresponding telephone 106. In this way, the administrator 127 may tell at a glance which of the telephones 102-108 of the networked telephone environment 100 are currently operating in a satisfactory manner, as opposed to which of the telephones 102-108 may require maintenance or other troubleshooting.

In some implementations, for example, a status of the telephone 106 may be obtained by the telephone system 123, e.g., by pinging the telephone 106 to determine a status of the telephone 106 on the site LAN 119. In some implementations, the telephones 102-108 may be registered on the site LAN 119 with the telephone system 123, so that the telephone system 123 may determine a current registration status of the telephone 106. As a result, various types of status information may be determined or deduced for the telephone 106, such as whether the telephone 106 has lost power, or has been unplugged from the site LAN 119.

Thus, the telephone portion 144 is operable to provide telephone administration functionality for each of the plurality of telephones 102-108 of the networked telephone environment 100. For example, as described, the telephone portion 144 may include the telephone icons 146 and 148, which correspond to identified telephones of the telephone system 123 (as described with reference to the example of the identification/association of the telephone icon 146 with the telephone 106 and/or with the user/secretary 130), so that each telephone icon 146 and 148 (and other icons, not shown) may be operable to provide associated telephone administration functionality for its corresponding telephone (including, e.g., configuration of the corresponding telephone, provision of status information for the corresponding telephone, or association of the corresponding telephone with a new, different, or additional user).

In providing the telephone administration functionality, many different techniques may be used in association with the telephone icons 146 and 148, as would be apparent. For example, the administrator 127 may "click on" or otherwise select the telephone icon 146, and may be provided in response with, for example, a telephone configuration screen for configuring the telephone 106 that is associated with the telephone icon 146. In another example, the administrator 127 may use a cursor to "hover over" the telephone icon 146, thereby to be provided with administration information about the corresponding telephone 106.

Additionally, or alternatively, the telephone icon 146 may be operable to provide the telephone administration functionality simply by virtue of its appearance (e.g., a color of the icon may provide information about a status of the corresponding telephone), and/or by inclusion or presentation of other icon(s) (e.g., the status icon 149). Specific examples of the telephone administration functionality provided by the telephone portion 144, and by the telephone icons 146 and 148, are provided below with respect to example telephone configuration screens illustrated with respect to FIG. 5.

Further with regard to the user interface 136, and similarly to the telephone portion 144, an external line portion 152 is included that is operable to provide external line administration functionality associated with the external line 112. For example, the external line portion 152 may include an external line icon 154 that corresponds to, or represents, the external line 112, and that is operable to provide the external line administration functionality for the external line 112.

Such external line administration functionality may include, for example, any administration functionality related to provision of telephone service from the external telephone network 110, and/or any administration functionality related to communication with the external telephone network 110. For example, the external line administration functionality may be associated with configuration of the ATA 116, for use with the telephone system 123. Specific examples of the external line administration functionality used in the configuration of the ATA 116 are provided below, for example, with respect to FIG. 6.

As with the telephone icons 146 and 148, the external line icon 154 may be used to provide or illustrate additional external line administration functionality. For example, the administrator 127 may click on, or hover over, the external line icon 154, in order to obtain, for example, a network address of the ATA 116, or a line type of the external line 112, or an adapter type of the ATA 116 (e.g., analog-to-VOIP, or analog-to-SIP). Additionally, a status icon 156 may be provided by, or in conjunction with, the external line icon 154, where, as discussed above with respect to the status icons 148 and 150, the status icon 156 may provide information regarding a current status of one or more of the external telephone service 110, the external line 112, the ATA 116, or a connection of the ATA 116 to the external line 112 and/or to the site LAN 119. Although shown as a separate icon, the status icon 156, or status information in general, may be represented directly by the external line icon 154. For example, status of the ATA 116 may be represented by changing a color or other appearance of the external line icon 154 itself.

An administrative action portion 158 also may be included in the user interface 136. In some implementations, the administrative action portion 158 may be used to provide at least some administration functionality, e.g., at least a portion of the telephone administration functionality or the external line administration functionality (as such, portions of the administrative action portion 158 may, in some implementations, be a part of, or be included in, the telephone portion 144 or the external line portion 152). For example, the administrative action portion 158 may provide telephone administration functionality, such as, for example, providing a link selectable by the administrator 127 for adding a telephone to the telephone system 123. Other links also may be provided for configuring an existing telephone of the telephone system 123 (e.g., changing a user associated with a selected telephone). For example, the administrator 127 may select (e.g., highlight) the telephone icon 146, and then may select "edit phone" from the administrative action portion 158 (or may provide such selection in the reverse order), in order, for example, to disassociate the user (secretary) 130 from the telephone 106 (e.g., in response to a resignation or re-assignment of the secretary).

Similarly, external line administration functionality may be provided, at least in part, by the administrative action portion 158. For example, the administrator 127 may add a new external line to the telephone system 123, in addition to the existing external line 112 that is illustrated in FIG. 1, by selecting an "add external line" link in the administrative action portion 158. As another example, a replacement adaptor for the ATA 116 may be added and configured, e.g., by selecting the existing external line icon 154, and then selecting a corresponding link (not shown in FIG. 1) in the administrative action portion 158.

It should be understood that the various administration functionalities provided by the administrative action portion 158 also may be provided by, or in conjunction with, the appropriate portion of the user interface 136. For example, as already discussed, the telephone administration functionality may be provided in conjunction with the telephone portion 144 and/or the telephone icons 146 and 148. Similarly, the external line administration functionality may be provided in conjunction with the external line portion 152 and/or the external line icon 154. In such cases, the administrative action portion 158 need not be included in the user interface 136, or, alternatively, the administrative action portion 158 may include a simple list of administrative actions, as opposed to active links for performing those actions.

Thus, in some implementations, the administrative action portion 158 may be provided as a convenience to the administrator 127, or may be provided as partially or wholly redundant to the administration functionalities provided by the telephone portion 144 or the external line portion 152. Accordingly, the administrator 127 may be able to find and perform a desired administration function in a fast, convenient, and intuitive manner.

In other example implementations, relevant portions of the administrative action portion 158 may be additionally or alternatively included within a corresponding portion of the user interface. For example, telephone administration functionality of the administrative action portion 158 (e.g., "add telephone" or "edit telephone") may be included in association with the telephone portion 144, while the external line administration functionality of the administrative action portion 158 (e.g., "add external line") may be provided in conjunction with the external line portion 152 of the user interface 136.

For example, the administrator 127 may implement some or all of the telephone administration functionality provided in the administrative action portion 158, simply by clicking on, or hovering over, the telephone portion 144. For example, a link for "add telephone" may be provided within the telephone portion 144, and/or the administrator 127 may simply be able to click on a blank or unfilled portion of the telephone portion 144 and be provided with the option to "add telephone," or perform other telephone administration functionality. For example, a pop-up window or configuration screen providing telephone administration functionality may be provided in response to the clicking, hovering, or other action of the administrator 127.

Although the user interface 136 of FIG. 1 illustrates the telephone portion 144 and the external line portion 152, it should be understood that user interface 136 may include a number of other portions, each related to at least one element (e.g., device) of the telephone system 123. For example, elements of the networked telephone environment 100 may include the users 128-134. As another example, a portion of the user interface 136 may be included that relates to extensions that are in use in the telephone system 123, where such extensions refer to numerical telephone extensions associated with one or more of the telephones 102-108, and/or with one or more of the users 128-134.

For example, the secretary 130 and/or the telephone 106 may be associated with an extension 160A that may represent, for example, a three or four digit number that may be dialed by another user (e.g., the user 128), to dial the telephone 106 and the secretary 130 from within the networked telephone environment 100. As described in more detail below, e.g., with respect to FIG. 2, the extension 160A may be associated with one or more users, or with one or more telephones.

For example, the same numerical extension associated with the extension 160a may be associated with the telephone 104 and/or the user 128, as represented by an extension 160B in FIG. 1. Thus, one numerical extension (e.g., 160a, 160b) may be associated with more than one telephone and/or more than one user. Conversely, a plurality of extensions may be associated with a single telephone and/or with a single user. For example, as shown in FIG. 1, the telephone 104 and/or the user 128 may be associated with the extension 160B and an extension 162.

Accordingly, it should be understood that a relationship(s) between extensions, users, and telephones, may be one-to-one, one-to-many, or many-to-many. As a result, the telephone system 123 provides a high degree of flexibility in routing and responding to incoming calls. Such relationships between the extensions 160A, 160B and 162 and the telephones 104 and 106 (or the users 128 and 130) may be included as part of the telephone administration functionality provided by the telephone portion 144. Moreover, the relationships between extensions, users, and telephones may easily be viewed by the administrator 127, using the user interface 136.

For example, the administrator 127 may select the telephone icon 146, in order to use telephone administration functionality that includes an assigning of the extension 160a to (or away from) the telephone 106. For example, the user (secretary) 130 may move from a first location in an office building having first telephone to a second location in the office building having a second telephone, in which case the administrator 127 may wish to transfer the extension 160a from the first telephone to the second telephone. In this way, the user (secretary) 130 may continue to utilize the same extension 160a. Specific examples of how telephones and extensions of the telephone system 123 may be illustrated and managed in the user interface 136 are provided in more detail below, e.g., with respect to FIG. 2.

Thus, the user interface 136 provides a convenient and intuitive interface by which the administrator 127 may configure or otherwise administer the telephone system 123. As a result, the administrator 127 may gain the benefits of the telephone system 123 for an associated business or other group of users, without requiring specialized assistance for such administration (e.g., as might be provided by seller of hardware or software associated with the telephone system 123). Accordingly, the administrator 127 may employ the telephone system 123 in a cost effective, convenient, and highly configurable manner.

Figure 5:
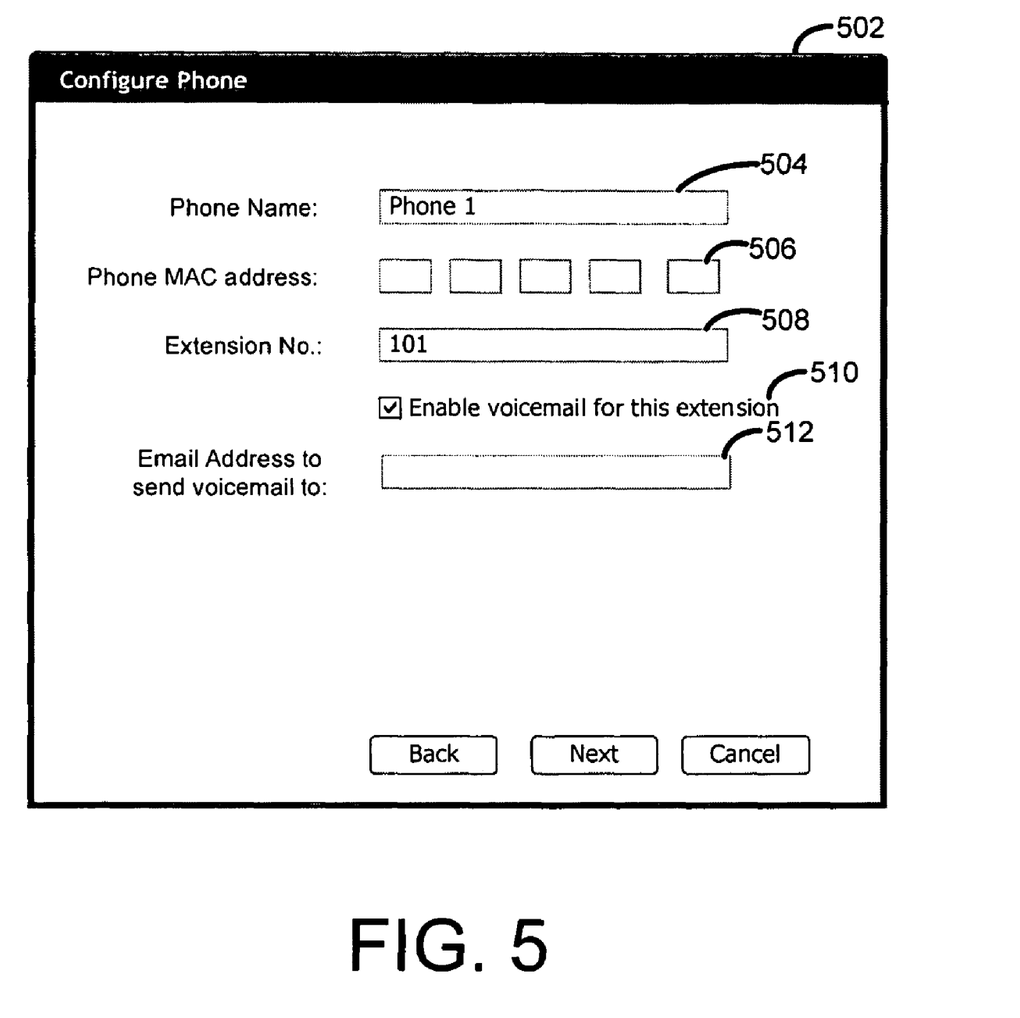
FIG. 5 is a screenshot illustrating a telephone configuration screen for the telephone system of FIG. 1.
Figure 6:
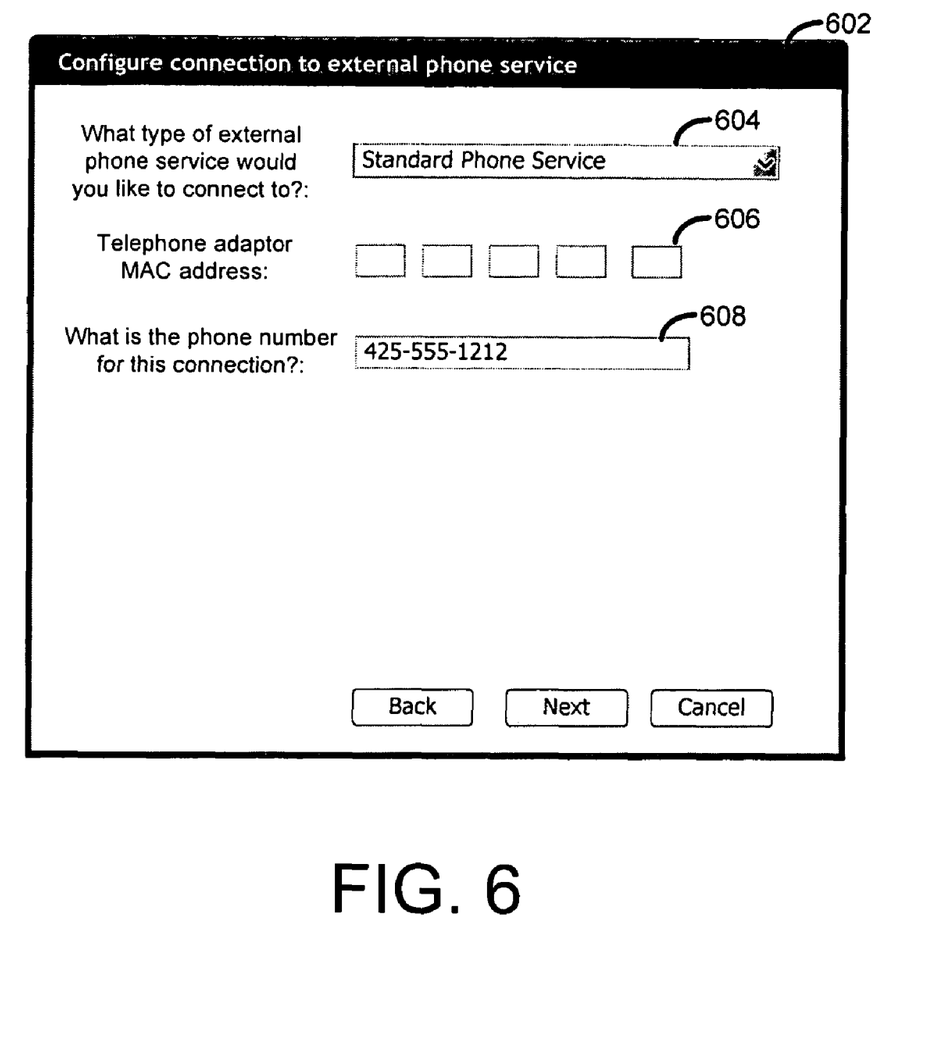
FIG. 6 is a screenshot illustrating an external line configuration screen for the telephone system of FIG. 1.

As explained above, then, at least a portion (e.g., the telephone portion 144, or the extension portion 152) of the graphical user interface 136 may be provided that is associated with a class of an element of a telephone system (e.g., the class may be telephones 102-108, extensions 160a, 160b, or 162, external line(s) 112, or users 128-134). Administration functionality may thus be provided for the element, and the administration functionality may include at least one configuration screen associated with configuring the element for use with the telephone system (as shown in FIG. 5 and FIG. 6). Once configured, an element icon (e.g., the telephone icon(s) 146, 148, or the extension icon 154) may be provided in the graphical user interface 136 that represents the element and is associated with the administration functionality. The administration functionality may include status information associated with a current status of the element within the telephone system, as shown by the status icons 149, 150, or 156.

In other words, a plurality of portions 144, 152 associated with the graphical user interface 136 may be provided. The plurality of portions may each be associated with at least one element of the telephone system 123, the at least one element including the telephone 102-108, the extensions 160a, 160b, 162, the external line 112, the telephone system 123 itself, or the users 128-134. Then, administration functionality may be provided for the at least one element, in conjunction with an associated one of the plurality of portions. As just referenced, and as described and illustrated in more detail with respect to FIG. 5 and FIG. 6, the administration functionality may include at least set-up functionality for configuring the element for use in the telephone system 123. An icon (e.g., the icons 146, 148, or 154) may be provided within at least one of the plurality of portions, wherein the icon represents an instance of the at least one element. That is, for example, the icon 146 represents the telephone 106, which is an instance of the telephones 102-108, and, as described, the telephone administration functionality for the telephone 106 is provided in association with the telephone icon 146.

FIG. 2 is a screenshot 200 of an alternative implementation of the user interface 136 of FIG. 1. In the example of FIG. 2, various elements of the example of FIG. 1 are included. For example, the telephone portion 144, the external line portion 152, the administrative action portion 158, and the header portion 138 are included. Further, the home icon 140 (which, as in the example of FIG. 1, has also been selected in the example of FIG. 2) is included, as is the call handling icon 142 (a selection of which is illustrated and discussed below with respect to the example of FIG. 3). Additionally, the header portion 138 includes an "other options" icon 202, as well as a "help" icon 204. The "other options" icon 202 may provide the administrator 127 with the option to, for example, set or change an administrator password, or save a usage log to a data file for later reference. Meanwhile, the help icon 204 may provide the administrator 127 may provide the help icon 204 provides administrator 127 with web sites or other sources of information for viewing possible problems with (and solutions for) the operation of the telephone system 123.

In the example of FIG. 2, then, with the home icon 140 having been selected, additional or alternative examples of details and implementations of the user interface 136 may be seen. For example, in the telephone portion 144, the telephone icon 148 and the status icon 150 are illustrated as being associated with the name "front desk." More specifically, although the telephone icon 148 is illustrated in FIG. 1 as using a graphical illustration or picture of the telephone 106, it also may be the case that the telephone icon 148 need not include a graphical illustration of a telephone, and may be virtually any other symbol or name that is understood to represent a corresponding telephone of the telephone system 123 (by virtue of, for example, the inclusion of the telephone icon 148 within the telephone portion 144). Further, the status icon 150 need not be a separate icon from the telephone icon 148, and, instead, may be provided as part of the telephone icon 148, as shown in FIG. 2.

Further in the telephone portion 144 FIG. 2, a telephone icon 206 associated with a name "shop floor" is illustrated, so that the telephone icon 206 should be understood to correspond to a telephone that is on a shop floor of a business that is using the telephone system 123. That is, the telephone corresponding to the telephone icon 206 may not be associated with any particular user, but rather may be associated with a selected location associated with the telephone system 123. Again, the administrator 127 may easily assign, view, or modify such associations, using the user interface 136.

In the example of FIG. 2, the telephone portion 144 provides telephone administration functionality that includes a convenient technique for associating one or more extensions with each of the telephone icons 148/150 and 206. Specifically, an expansion icon 208 is included that may be used to expand or contract extension information associated with the telephone icon 148. Thus, for example, the telephone icon 148 corresponding to a "Front Desk" telephone of the telephone system 123 may be seen by virtue of selection and expansion of the icon 208, so that a plurality of extensions may be seen to be associated therewith.

For example, an extension icon 210 may be seen to be associated with both a user "John" and a numerical extension "x103" in the example of FIG. 2. Also, a status icon 212 providing information about a status of the numerical extension "x103" and/or the user "John" is illustrated. Further, an extension icon 214 associated with a numerical extension "x101" and a user "Operator" are also illustrated as being selectably expanded by selection of the expansion icon 208. Finally, a numerical extension "x102" and a user "Receptionist" are seen to be associated with an extension icon 216.

As may thus be understood from the telephone portion 144 of FIG. 2, any user of the telephone system 123 attempting to dial any of "Operator" (at extension x101), "Receptionist" (at extension x102), or "John" (at extension x103), will cause the telephone associated with the telephone icon 148 to begin ringing. In other words, multiple extensions and users may be associated with one selected telephone, and such associations between the extensions/users and telephones may easily be viewed or configured.

Further in the example of FIG. 2, an extension portion 218 is illustrated which illustrates an inverse of the information provided in the telephone portion 144. That is, for example, the extension portion 218 illustrates the extension icons 210, 214, and 216, and, in association with the extension icon 210 for the numerical extension "x103" and the user "John," presents an expansion icon 220 (which has been selected in the example of FIG. 2 to illustrate the association(s) between the extension icon 210 and corresponding telephone icons 148 and 206).

Accordingly, it should be understood that any user dialing the numerical extension "x103" to reach the user "John" will cause a ringing of two telephones, i.e., a first telephone associated with the "front desk" (i.e., the telephone associated with the telephone icon 148), and a second telephone associated with the "shop floor" (i.e., the telephone associated with the telephone icon 206). Such a multi-ring configuration may be advantageous, for example, where the associated user is likely to be in either of two (or more) places, or where the administrator 127 desires that telephones of both an employee and the employee's assistant ring at the same time, so that the assistant may respond to calls to the employee in the employee's absence.

Thus, between them, the telephone portion 144 and the extension portion 218 are capable of quickly and intuitively illustrating any of a one-to-one, one-to-many, or many-to-many relationship between telephones (or telephone icons) and associated extensions (or extension icons). Accordingly, the administrator 127 may easily determine, assign, modify, or reassign associations between telephones and corresponding extensions (and associated users). For example, addition of the extension icon 210 to an association with the telephone icon 148 may be considered to be part of the telephone administration functionality associated with the telephone corresponding to the telephone icon 148. That is, the administrator 127 may, for example, select the telephone icon 148, and may be provided in response with a configuration screen that includes an option for adding the extension icon 210 (i.e., the numerical extension "x103"). Additionally, or alternatively, the user may select the extension icon 210 (e.g., within the extension portion 218) and may be provided in response with an extension configuration screen by which the administrator 127 may associate the telephone icon (and thereby, the corresponding telephone) with the extension icon 210 (and thereby, with the numerical extension "x103").

The example of FIG. 2 also illustrates an alternative implementation of the external line portion 152, in which the external line icon 154 is illustrated in conjunction with the status icon 156 (the latter being illustrated in FIG. 2 as a check mark, indicating a satisfactory status of the external line 112 and the ATA 116 that are associated with the external line icon 154). In some implementations, the check mark 156 may be color-coded (e.g., may be green to indicate a satisfactory status of the external line 112 or the ATA 116). Further, the external line icon 154 is illustrated as including a telephone number (i.e., 425-555-1212) associated with the external line 112, where it should be understood that the illustrated telephone number may be provided, for example, by the public telephone provider associated with the external telephone network 110.

Similarly, an additional external line icon 222 is illustrated in association with a status icon 224, where the status icon 224 is illustrated as a "?" that may indicate, for example, an unknown or indeterminate status of a corresponding external line. Finally in the external line portion 152 of FIG. 2, an external line icon 226 is illustrated in association with a status icon 228. Specifically, the external line icon 226 is illustrated as not yet being associated with a valid or operating external line (or line adaptor). Thus, the external line icon 226 provides external line administration functionality that includes an ability to configure new or additional external line(s). As such, the external line status icon 228 includes an "X" (which may be color-coded red), and that may indicate a current non-working status of an associated external line (or, in the present case, may indicate a non-configured external line).

A user portion 230, analogously to the telephone portion 144, the extension portion 218, and the external line portion 152, provides user administration functionality for at least one user associated with the telephone system 123. More specifically, the user portion includes at least one user icon corresponding to at least one of the users of the telephone system 123, where the user icon is operable to provide the user administration functionality for at least one user. In the example of FIG. 2, the user portion 230 thus lists a user icon 232, corresponding to the user "John," at the numerical extension "x103." The user portion 230 also includes a user icon 234 corresponding to the "receptionist" at the numerical extension "x102," as well as a user icon 236 corresponding to the user "operator," at the numerical extension "x101."

Thus, each user may be illustrated and associated with one or more extensions and, although not specifically illustrated in FIG. 2, each user may be illustrated as being in association with one or more corresponding telephones. Although not specifically illustrated in FIG. 2, it should be apparent that any of the user icons 232, 234, or 236 may be associated with an expansion icon, similar to the expansion icons 208 and 220 discussed above, that would allow the administrator 127 to expand a selected one of the user icons 232, 234, or 236, in order to see extensions and/or telephones associated therewith.

An email provider portion 238 includes an email provider icon 240 corresponding to an email provider associated with the telephone system 123. As discussed in more detail below, for example, with respect to FIG. 5, the corresponding email provider may be used to forward voicemails left for a given user or a given telephone to a designated email account associated with the voicemail. An email provider status icon 242 also is illustrated, which may thus provide information regarding a current status of the email provider, such as, for example, a current status of an incoming or outgoing server of the email provider.

Further in FIG. 2, a telephone system portion 244 includes a telephone system icon 246 corresponding to the telephone system 123 of the networked telephone environment 100. As described above with respect to FIG. 1, the telephone system 123 may provide a number of features and functions regarding, or related to, administration of the networked telephone environment 100. For example, the telephone system 123 may be involved in routing, switching, or otherwise connecting telephones 102-108.

As another example, the telephone system 123 may be involved in providing usage logs or other tracking or monitoring information related to the telephone system 123. In FIG. 2, status information 248 related to the telephone system 123 may be included within the telephone system portion 244. For example, as shown, an error log may be provided, so that the administrator 127 may view errors detected in the networked telephone environment 100. Further, an available memory associated with the telephone system 123 may be provided, so that, for example, the administrator 127 may determine whether the telephone system 123 is at or near capacity, e.g., in terms of current usage and/or in terms of a number of connected devices. Finally in the telephone system portion 244, a status of a current connection to the email provider of the portion 238 may be included.

In an administrative action portion 158 of the screenshot 200 of the user interface 136, and as discussed above with respect to FIG. 1, administrative actions may be provided or otherwise referenced, for a use and convenience of the administrator 127. For example, a subsection 250 related to the telephone system 123 may be included in the administrative action portion 158, where the subsection 250 includes selections for the administrator 127 related to viewing a usage or error log, viewing available memory of the telephone system 123, or viewing the status of an email connection associated with the telephone system administration. Similarly, subsections 252, 254, 256, 258, and 260 provide administrative actions associated with, respectively, telephones, extensions, external line connections, users, and email providers, as labeled in FIG. 2.

Accordingly, the subsections 250-260 provide additional or alternative technique(s) by which the administrator 127 may perform certain administration functionality associated with any or all of the elements (e.g., devices) of the telephone system 123. As also described above with respect to FIG. 1, some or all of any of the subsections 250-260 may be more directly included within, or associated with, a corresponding portion(s) of the user interface 136. For example, the telephone subsection 252 may be partially or wholly included within, or placed alongside of, the telephone portion 144.

As also should be apparent from the present description, any of the telephone administration functionality provided by the telephone subsection 252 may be provided directly by the telephone portion 144, e.g., by clicking on a portion of the telephone portion 144 (which, as just referenced, may include one or more of the links of the subsection 252), or by clicking on or otherwise selecting one of the telephone icons 148 or 206. Similar comments apply to the subsections 254-260 and corresponding portions of the user interface 136.

Also, although FIG. 2 illustrates a number of different portions of the user interface (e.g., the telephone portion 144, the external line portion 152, the extension portion 218, the user portion 230, the email provider portion 238, and the telephone system portion 244), it should be understood that many variations may be implemented. For example, not all of these portions need be included in the user interface 136, and, rather, virtually any desired combination or subset(s) thereof may be included. Moreover, a given portion may be incorporated in whole or in part within another portion (e.g., the extension portion 218 may partially be incorporated into the telephone portion 144, by inclusion of the extension icons in the telephone portion 144, in association with corresponding telephone icons), and, still further, different ones of these portions may be included on different screens of the user interface 136.

Figure 3:
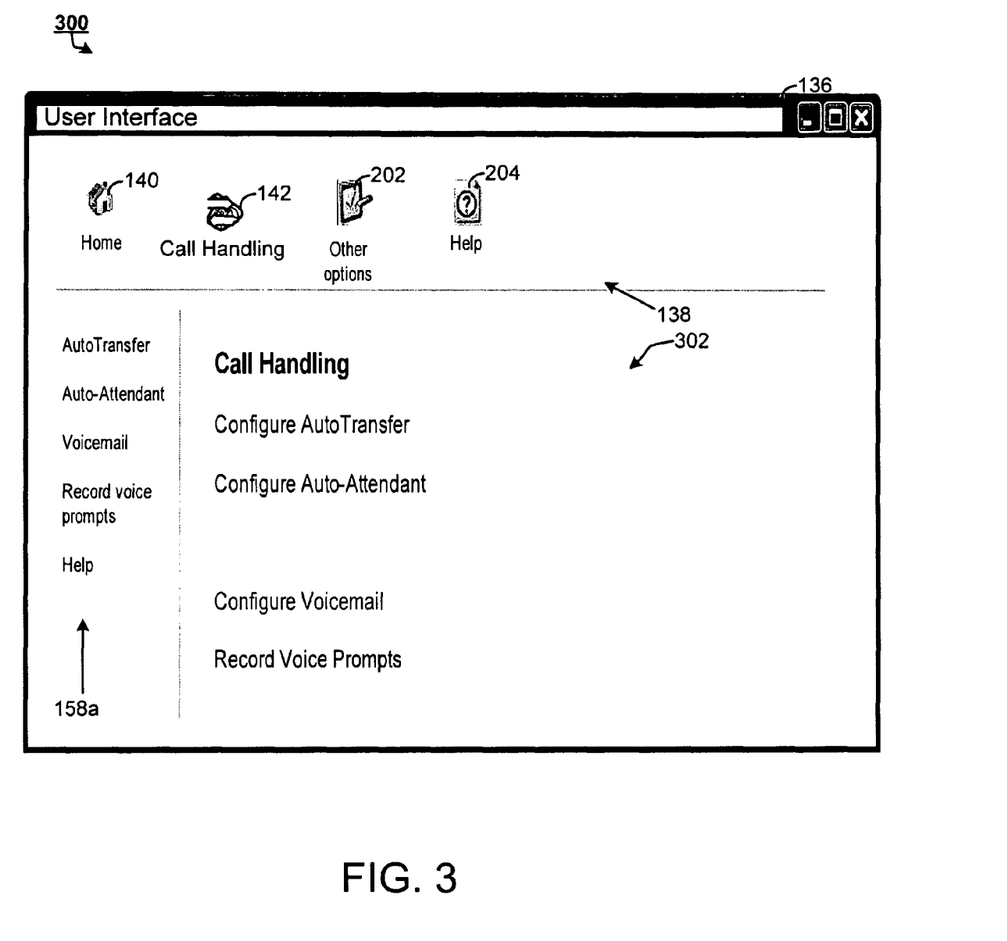
FIG. 3 is a screenshot of an alternative implementation of the user interface of FIGS. 1 and 2.

FIG. 3 is a screenshot 300 of the user interface 136 of FIGS. 1 and 2, in which the call handling icon 142 has been selected. As a result, a call handling portion 302 is included in the user interface 136, in which a plurality of call handling rules and/or options are provided that allow the administrator 127 to configure or modify a manner in which incoming calls to the telephone system 123 are handled.

For example, the call handling portion 302 includes an option to configure an auto-transfer rule, which refers to an ability of the telephone system 123 to automatically transfer an incoming call to a specified telephone or extension. For example, such an auto-transfer rule may stipulate that an incoming call to the telephone system 123, and/or to a particular employee, may be automatically transferred to a receptionist, or to a secretary of the employee, or to a coworker of the employee who shares responsibility with the employee.

Further, an option is provided to configure an auto-attendant of the telephone system 123. Such an auto-attendant generally may refer to an automated system for providing a caller with potentially useful information, or for providing the caller with possible actions that may be useful to the caller. For example, the auto-attendant may provider hours of operation of the business, a telephone directory for employees of the business, or a number of options for selecting a particular class of employee of the business (e.g., technical assistance or billing assistance)).

Options also are provided for allowing the administrator 127 to configure voicemail of the telephone system 123. For example, the voicemail may be associated with the email provider discussed above with respect to FIG. 2, so that voicemails may be forwarded to users of the telephone system 123 by email. Similarly, the administrator 127 may be provided with an option to record voice prompts that may be associated with, for example, the auto-attendant or the voicemail system.

Also in FIG. 3, the administrative action portion 158 (differentiated in FIG. 3 by the label 158*a*) is illustrated as corresponding in the example to administrative actions associated with the call handling portion 302. That is, the administrative action portion 158*a* provides a number of additional or alternative administration functions related to call handling. For example, the administrative action portion 158 may include links, e.g., to additional screens, user interfaces, or windows, that allow the administrator 127 to perform some or all of the call-handling administration functionality just discussed (i.e., auto-transfer, auto-attendant, voicemail, or voice prompts).

Figure 4:
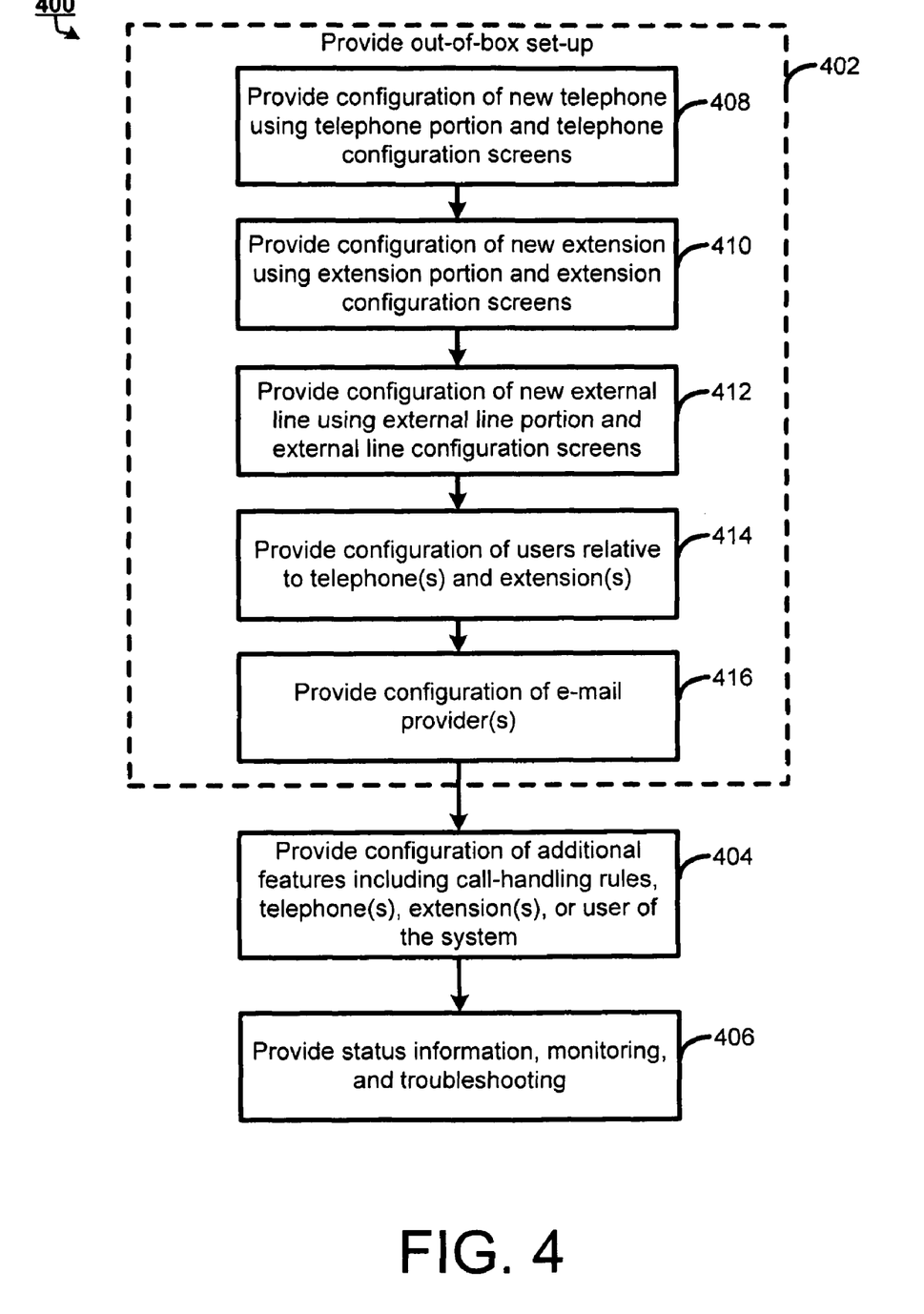
FIG. 4 is a flowchart illustrating an operation of the user interface(s) of FIGS. 1-3.

FIG. 4 is a flowchart 400 illustrating an operation of the user interface(s) 136 of FIGS. 1-3. In FIG. 4, the user interface 136 initially provides fast and convenient "out-of-box" setup for the telephone system 123 (402). For example, as discussed above with respect to FIGS. 1 and 2, the administrator 127 may easily view and select the telephone portion 144, the external line portion 152, and other portions of the user interface 136, including the administrative action portion 158, to obtain an initial configuration and operation of the telephone system 123. Further details and examples of such out-of-box configuration are provided below, e.g., (408-416, and FIGS. 5 and 6).

Thereafter, the user interface 136 may provide additional configuration of functions and features that may not be necessary or desired for an initial operation or implementation of the telephone system 123 (404). In this way, for example, the administrator 127 may experience the advantage of initiating operation of the telephone system 123, at least at a rudimentary or serviceable level, and may thereafter customize or configure the telephone system 123, as the administrator 127 becomes more familiar/capable with the features and functions of the user interface 136.

For example, additional features that may be configured on an ongoing basis may include call handling rules, such as those discussed above with respect to FIG. 3, or may include the addition or modification of a new or existing telephone, extension, or user of the telephone system 123. Further, as would be apparent, any other element of the networked telephone environment 100 also may be configured, re-configured, or otherwise modified at this stage, using the user interface 136.

During or after the further configuration of the telephone system 123, or of associated elements, the user interface 136 may provide status information, monitoring, and troubleshooting for some or all of the elements of the telephone system 123 (406). For example, as described above with respect to FIGS. 1-3, a status icon may be provided in association with any of the icons of the user interface 136, so that a current status of an associated element of such icons may be readily apparent to the administrator 127 during a viewing of the user interface 136.

Accordingly, the administrator 127 may easily monitor a current status of the telephone system 123, or of any associated element (e.g., device). For example, the telephone system 123 may provide monitoring of an error or usage log associated with use of the telephone system 123, which may be viewed using the user interface 126 (e.g., the telephone system portion 244). In other examples, a status of any telephone, extension, external line, user, or email provider may quickly be noticed and corrected, simply by viewing a corresponding icon and/or status icon.

Still further, any problems, difficulties, or malfunctions of the telephone system 123 may be corrected by a troubleshooting functionality associated with the status and/or monitoring information. For example, troubleshooting screens associated with a particular portion or icon of the user interface 136 may be provided. For example, if the status icon 156 of the external line icon 154 were to illustrate a possible or existing malfunction thereof, then selection of the status icon 156 may result in a provision of one or more troubleshooting screens, provided in conjunction with the user interface 136, that instruct the administrator 127 as to possible causes of, and solutions for, difficulties or malfunctions associated with the external line 112 or the ATA 116. Similar examples would apply, for example, to telephone, extension, or user icons.

With regard to examples of further detail associated with the out-of-box setup (402), it should be apparent from the above discussion with respect to FIGS. 1-3 that each portion or icon of the user interface 136 may be provided or configured, as selected or desired by the administrator 127. For example, the administrator 127 may add a new telephone to the telephone system 123, where configuration of the new telephone may be provided by the user interface 136 using the telephone portion 144 and associated telephone configuration screens (408). Additionally, or alternatively, the telephone subsection 252 of the administrative action portion 158 of FIG. 2 may be used by the administrator 127 to add the new telephone. Examples of a telephone configuration screen are provided in more detail with respect to FIG. 5, below.

Similarly, a new extension may be added, and configuration of the extension may be provided using the extension portion 218 and associated extension configuration screens (410). For example, one or more extensions may be provided in response to a selection of the extension portion 218 by the administrator 127. Additionally, or alternatively, the extension subsection 254 of the administrative action portion 158 of FIG. 2 may be used by the administrator 127 to add the new extension.

A new external line may be added, and configuration thereof may be provided by the user interface 136, again, for example, by way of corresponding external line configuration screens (412). Examples of such an external line configuration screen are provided below in more detail with respect to FIG. 6.

A configuration of users, e.g., relative to one or more telephones or one or more extensions, also may be provided (414). For example, the administrator 127 may add a name of a new user, as well as an extension associated with the new user. The administrator 127 also may add voicemail or other preferences of the new user.

Configuration of corresponding email providers also may be provided (416). For example, a simple mail transfer protocol (SMTP) host may be selected and configured, and an e-mail address of the administrator 127 may be included, so that the administrator 127 may be notified by e-mail in event of a malfunction of the email provider.

It should be understood that the operations of FIG. 4 may be performed recursively or repetitively, as needed, and may be performed in a sequence that is different than the illustrated sequence. For example, an existing telephone may be re-configured at any time deemed necessary by the administrator 127 (e.g., by clicking on the corresponding telephone icon).

FIG. 5 is a screenshot illustrating a telephone configuration screen (e.g., window) 502, as referenced above with respect to FIG. 4 (408). In FIG. 5, the window 502 may be used for configuring a new telephone of the telephone system 123. For example, the window 502 includes a field 504 for entering a name associated with the new telephone to be added. For example, the telephone name may be associated with a user of the telephone, or a location of the telephone within the business. Accordingly, the administrator 127 may easily be able to remember and identify the new telephone, for present and future administration thereof. The field 504 may be presented in conjunction with examples of possible names for the new telephone (e.g., "shop floor" or "John's phone"), so as to assist the administrator 127 in determining an appropriate name for the new telephone.

A field 506 is included in which the administrator 127 is requested to enter a media access control (MAC) address of the telephone. That is, in the example of FIG. 1, the telephone system 123 is illustrated as being connected over the site LAN 119, and the telephones 102-108 may be network-ready telephones that may be plugged into the site LAN 119, e.g., by Ethernet or other network cable, or by way of a wireless network. As a node on the site LAN 119, the telephone(s) 102-108 may be recognized by the telephone system 123 by a network address, i.e., the MAC address.

A field 508 is provided by which the administrator 127 may associate a numerical extension with the new telephone, simply by entering the numerical extension. A message 510 and associated check box allow the administrator 127 to easily decide whether or not to enable voice mail for the extension of the field 508 (i.e., by selection or non-selection of the checkbox). Further, a field 512 allows the administrator 127 to type in an email address to be associated with the voicemail, if the voicemail is enabled at the field 514. Further, although not illustrated explicitly in FIG. 5, it should be understood, e.g., from the above description of FIG. 2 (e.g., the description of the telephone portion 144 and the extension portion 218), that the window 502 may easily be used to assign multiple extensions to the telephone of the field 502. For example, in addition to the field 508, additional extension fields may be included for associating additional, i.e., multiple, extensions with the telephone of the field 504. Resulting relationship(s) between the telephone of the field 504 and the extensions of the field 508 (and related fields) may thus be reflected in the user interface 200 of FIG. 2 (e.g., using the expansion icon 208). Of course, the window 502, or a separate window, also may be used to add/configure a new extension, in which case multiple telephones may be added to the new/configured extension, so that resulting relationships between the extension and the telephones may be reflected in the user interface 200 of FIG. 2 (e.g., using the expansion icon 220).

Although FIG. 5 is illustrated with respect to an initial configuration of a newly-added telephone, it should be understood that similar windows/screens may be used to re-configure an existing telephone. In this case, the various fields may be partially or completely pre-filled, for the convenience of the administrator 127 and to reduce data error entries. Similar comments apply to configuration of other elements (e.g., devices) of the telephone system 123, e.g., with respect to (re-)configuration of external lines, as described and illustrated below with respect to FIG. 6. Of course, various other configuration parameters may be associated with the telephone to be added/configured, such as, for example, a location or a user.

FIG. 6 is a screenshot of an external line configuration screen associated with the operation(s) of FIG. 4 of adding a new external line to the networked telephone environment 100 (412). In a window 602 of FIG. 6, a field 604 is provided by which the administrator 127 may select a type of external telephone service that is to be added. In the example of FIG. 6, the field 604 illustrates a selection of a standard telephone service.

In FIG. 6, a field 606 is included by which a MAC address of a telephony adapter may be provided by the administrator 127. For example, the administrator 127 may provide a MAC address of the ATA 116 in the field 606. A field 608 is provided in which the administrator 127 may provide a telephone number associated with the external line being added. That is, this telephone number may represent, for example, a telephone number provided by a telephone provider associated with the external telephone network 110 of FIG. 1. Of course, other information may be used in configuring the newly-added telephone adaptor, such as, for example, an IP address of the telephone adaptor.

Further, although FIGS. 5 and 6 are illustrated with respect to configuring telephone(s) and external line(s), respectively, it should be understood that the user interface 136 of FIGS. 1 and 2 may be used in association with the configuration of any of the elements associated with the telephone system 123, including the telephone system 123 itself. For example, a configuration screen may be provided for configuring the extensions of the extension portion 218. In this case, for example, configuration of the extension(s) may include or be associated with the extension number (e.g., x102), a name of the person using the extension, or voicemail characteristics associated with the extension (e.g., a voicemail password, or whether voicemail is enabled).

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. An apparatus including a computing device, a storage medium, and a display, the storage medium including instructions that, when executed by the computing device, cause the computing device to provide a user interface on the display, the user interface comprising:

a telephone system user interface portion of the user interface configured for providing telephone system administration functionality for a telephone system including a plurality of telephones, wherein the telephone system is a voice over internet protocol (VoIP) telephone system that includes the computing device, and wherein the telephone system is coupled to a local area network (LAN) that is coupled to an analog telephone adapter (ATA) that is coupled to a public telephone system, and wherein the ATA converts analog telephone signals from the public telephone system into a digital format compatible with the LAN and the telephone system;

a telephone system icon that corresponds to the telephone system, wherein the telephone system icon is included in the telephone system user interface portion, and wherein the telephone system icon is configured for providing the telephone system administration functionality, and wherein the telephone system administration functionality is configured for adding telephones to the telephone system and for removing telephones from the telephone system;

a telephone user interface portion of the user interface configured for providing telephone administration functionality for each of the plurality of telephones of the telephone system; and a telephone icon that is displayed in the telephone user interface portion and that corresponds to at least one telephone of the plurality of telephones, wherein the displayed telephone icon is configured for providing the telephone administration functionality for the at least one telephone to the administrator, and wherein the telephone administration functionality allows an administrator to configure the at least one telephone and to associate and disassociate one or more calling features with the at least one telephone, wherein the user interface and the telephone system user interface portion and the displayed telephone system icon and the telephone user interface portion and the telephone icon are all displayed on the display simultaneously.

2. The apparatus of claim 1 further comprising:

an external line user interface portion of the user interface, wherein the external line user interface portion is configured for providing external line administration functionality for at least one external line providing telephone service to the telephone system; and an external line icon that is displayed in the external line portion and that corresponds to the at least one external line, wherein the displayed external line icon is configured for providing the external line administration functionality for the at least one external line.

3. The apparatus of claim 1 further comprising:

an extension user interface portion of the user interface that is configured for providing extension administration functionality for an extension associated with the at least one telephone; and an extension icon that is displayed in the extension user interface portion and that corresponds to the extension, wherein the displayed extension icon is configured for providing the extension administration functionality for the extension.

4. The apparatus of claim 1 further comprising:

a user user interface portion of the user interface that is configured for providing user administration functionality for at least one user associated with the telephone system; and a user icon that is displayed in the user portion and that corresponds to the user, wherein the displayed user icon is configured for providing the user administration functionality for the at least one user, wherein the user is a person.

5. The apparatus of claim 1 further comprising an e-mail provider user interface portion of the user interface, wherein the e-mail provider user interface portion is configured for providing configuration of an e-mail provider that is associated with the telephone system.

6. The apparatus of claim 1 further comprising an administrative action user interface portion of the user interface, wherein the administrative action user interface portion is configured for providing at least one action associated with configuring at least one of a telephone, an extension, an external line, a user, a telephone system, or an e-mail provider.

7. The apparatus of claim 1 further comprising a call handling user interface portion of the user interface, wherein the call handling user interface portion is configured for providing call handling administration functionality including at least one user interface screen for assigning call handling rules for incoming calls to the telephone system.

8. A method comprising:

displaying a graphical user interface that represents a telephone system including a plurality of telephones, wherein the telephone system is a voice over internet protocol (VoIP) telephone system that includes a computing device and a display, and wherein the telephone system is coupled to a local area network (LAN) that is coupled to an analog telephone adapter (ATA) that is coupled to a public telephone system, and wherein the ATA converts analog telephone signals from the public telephone system into a digital format compatible with the LAN and the telephone system;

displaying a telephone system user interface portion of the graphical user interface wherein the displayed telephone system user interface portion is configured for providing telephone system administration functionality for the telephone system;

displaying a telephone system icon that corresponds to the telephone system, wherein the displayed telephone system icon is included in the displayed telephone system user interface portion, and wherein the displayed telephone system icon is configured for providing the telephone system administration functionality to an administrator, and wherein the telephone system administration functionality is configured for adding telephones to the telephone system and for removing telephones from the telephone system;

displaying an element user interface portion of the graphical user interface, wherein the element user interface portion is configured for providing element administration functionality for the element to the administrator; and displaying an element icon corresponding to the element, wherein the element icon is included in the displayed element user interface portion, and wherein the displayed element icon is configured for providing the administration functionality to the administrator, and wherein the element administration functionality includes status information representing a current status of the element with respect to the telephone system, wherein the graphical user interface and the displayed telephone system user interface portion and the displayed telephone system icon and the displayed element user interface portion and the displayed element icon are all displayed on the display simultaneously.

9. The method of claim 8 wherein the element user interface portion includes a telephone user interface portion, the element includes a telephone, and the element administration functionality includes telephone administration functionality for the telephone.

10. The method of claim 8 wherein the element user interface portion includes an external line user interface portion, the element includes an adaptor or connector associated with the external line, and the element administration functionality includes external line administration functionality associated with administering the adaptor or connector.

11. The method of claim 8 wherein the element user interface portion includes an extension user interface portion, the element includes an extension, and the element administration functionality includes extension administration functionality for the extension.

12. The method of claim 8 wherein the element user interface portion includes a telephone user interface portion and an extension user interface portion, and wherein the element icon includes a telephone icon representing a telephone of the telephone system and further includes an extension icon representing an extension of the telephone system.

13. The method of claim 12 wherein the telephone icon includes a plurality of telephone icons associated with a plurality of telephones of the telephone system, and the extension icon includes a plurality of extension icons associated with a plurality of extensions of the telephone system, and wherein each of the plurality of telephones icons is displayed in association with at least one of the plurality of extension icons to illustrate a relationship between the telephones and the extensions.

14. The method of claim 13 wherein each of the plurality of extension icons is displayed in association with at least one of the plurality of telephone icons to illustrate relationships between the extensions and the telephones.

15. The method of claim 8 wherein the element user interface portion includes at least one field for receiving user-provided information associated with configuring the element.

16. The method of claim 8 wherein the status information includes a status icon displayed within the element user interface portion in association with the element icon.

17. A method comprising:
displaying a plurality of portions of a graphical user interface, wherein the displayed plurality of portions are each associated with at least one element of a telephone system;
displaying a telephone system user interface portion of the graphical user interface, wherein the displayed telephone system user interface portion is configured for providing telephone system administration functionality for the telephone system;
displaying a telephone system icon that corresponds to the telephone system, wherein the displayed telephone system icon is included in the displayed telephone system user interface portion, and wherein the displayed telephone system icon is configured for providing the telephone system administration functionality to an administrator, and wherein the telephone system administration functionality is configured for adding telephones to the telephone system and for removing telephones from the telephone system;
providing administration functionality for the at least one element via one of the plurality of portions,
wherein the graphical user interface and the displayed telephone system user interface portion and the displayed telephone system icon and the displayed plurality of portions are all displayed on the display simultaneously.

* * * * *